(12) United States Patent
Steller et al.

(10) Patent No.: US 8,132,851 B2
(45) Date of Patent: Mar. 13, 2012

(54) REINFORCING ELEMENT FOR A LOWER AREA OF A FRONT BUMPER, AND CORRESPONDINGLY EQUIPPED BUMPER FOR A MOTOR VEHICLE

(75) Inventors: Claus Steller, Gross-Gerau (DE); Roland Kammerer, Caluire (FR)

(73) Assignee: GM Global Technology Operations LLC, Detroit, MI (US)

( * ) Notice: Subject to any disclaimer, the term of this patent is extended or adjusted under 35 U.S.C. 154(b) by 226 days.

(21) Appl. No.: 11/572,340

(22) PCT Filed: Jul. 19, 2005

(86) PCT No.: PCT/EP2005/007860
§ 371 (c)(1),
(2), (4) Date: Jan. 12, 2009

(87) PCT Pub. No.: WO2006/008137
PCT Pub. Date: Jan. 26, 2006

(65) Prior Publication Data
US 2009/0115205 A1 May 7, 2009

(30) Foreign Application Priority Data
Jul. 21, 2004 (DE) .......................... 10 2004 035 435

(51) Int. Cl.
*B60R 19/22* (2006.01)
(52) U.S. Cl. .................... 296/187.04; 293/120; 293/133
(58) Field of Classification Search ............. 296/187.04; 293/120–122, 132, 133
See application file for complete search history.

(56) References Cited

U.S. PATENT DOCUMENTS

| 6,438,577 | B1 | 8/2002 | Owens |
| 6,540,275 | B1 * | 4/2003 | Iwamoto et al. ................. 293/24 |
| 6,634,702 | B1 | 10/2003 | Pleschke et al. |
| 6,886,872 | B2 * | 5/2005 | Matsumoto et al. .......... 293/115 |
| 6,893,064 | B2 * | 5/2005 | Satou ............................ 293/132 |
| 7,013,951 | B2 | 3/2006 | Bauer et al. |

(Continued)

FOREIGN PATENT DOCUMENTS
DE 10112424 A1 9/2002
(Continued)

OTHER PUBLICATIONS
PCT Search Report, PCT/EP2005/007860 dated Oct. 28, 2005.
(Continued)

*Primary Examiner* — Dennis H Pedder
(74) *Attorney, Agent, or Firm* — Ingrassia Fisher & Lorenz, P.C.

(57) ABSTRACT

The invention discussed above provides a reinforcing element for a lower impact region of a front bumper of a motor vehicle for the protection of pedestrians during the impact of a lower leg section against the lower impact region of the front bumper. The reinforcing element is thus connected behind, in direction of travel, the lower front bumper region to the latter. The reinforcing element has a base plate with reinforcing ribs attached thereto. It extends essentially in horizontal direction, approximately over the width of the front bumper. It is thus proposed for the first time that the reinforcing element is designed as a separate plate which can be integrated in the lower bumper region. The above invention also discusses a front bumper equipped therewith for a motor vehicle.

10 Claims, 7 Drawing Sheets

U.S. PATENT DOCUMENTS

| | | | |
|---|---|---|---|
| 7,410,018 B2 * | 8/2008 | Satou | 180/68.4 |
| 2002/0129981 A1 | 9/2002 | Satou | |

FOREIGN PATENT DOCUMENTS

| | | |
|---|---|---|
| DE | 60004116 T2 | 4/2004 |
| DE | 60009985 T2 | 9/2004 |
| DE | 102004007571 | 8/2005 |
| DE | 102007019481 A1 | 11/2008 |
| DE | 102009041769 A1 | 3/2011 |
| EP | 1038732 | 9/2000 |
| EP | 1238862 | 9/2002 |
| EP | 1241080 | 9/2002 |
| EP | 1300293 | 4/2003 |
| EP | 1433664 | 6/2004 |
| EP | 1564088 | 8/2005 |
| FR | 2859970 | 3/2005 |
| JP | 2000006739 | 1/2000 |
| JP | 2000264143 A | 9/2000 |
| JP | 2002-274298 * | 2/2002 |
| JP | 2002274298 A | 9/2002 |
| JP | 2002274430 A | 9/2002 |
| JP | 2002283937 A | 10/2002 |

OTHER PUBLICATIONS

German Search Report, Application No. 10 2004 035 435.9 dated Mar. 7, 2005.

PCT International Preliminary Report on Patentability for PCT/EP2005/007860 dated Jan. 30, 2007.

PCT Written Opinion for PCT/EP2005/007860.

* cited by examiner

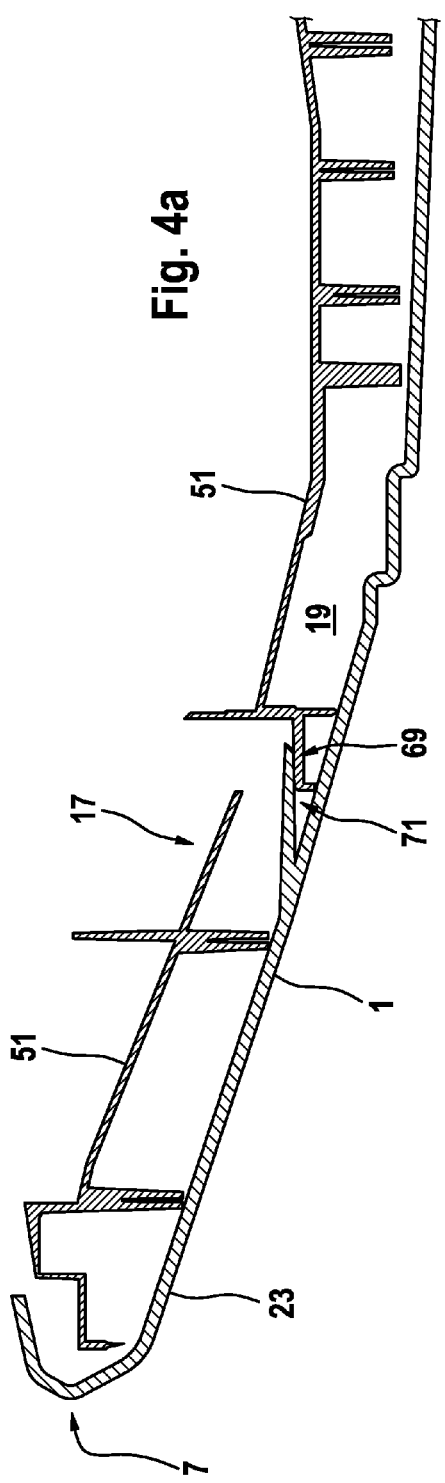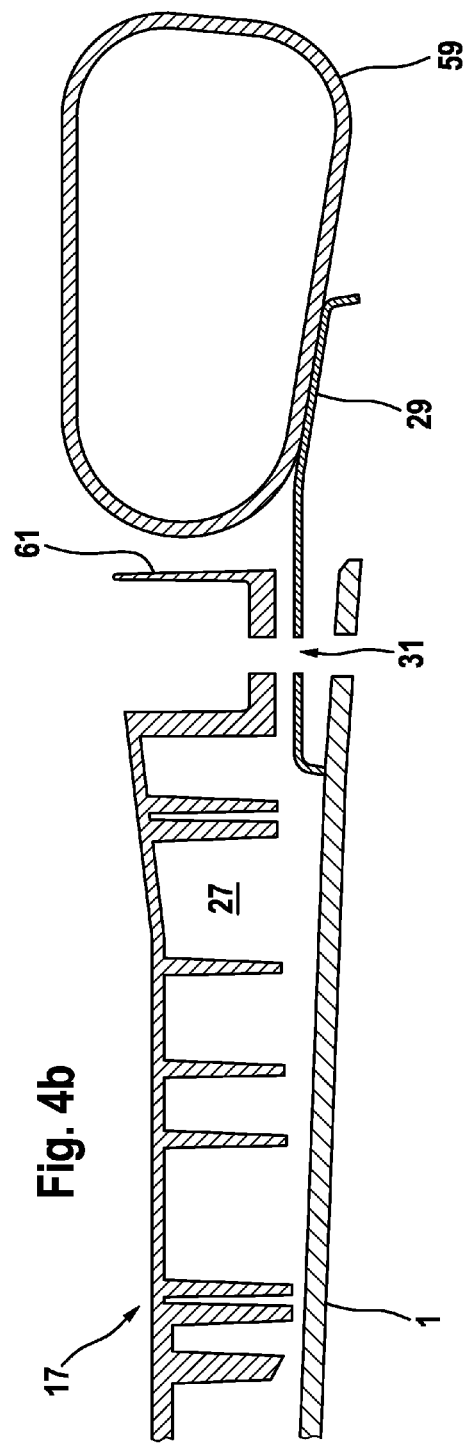

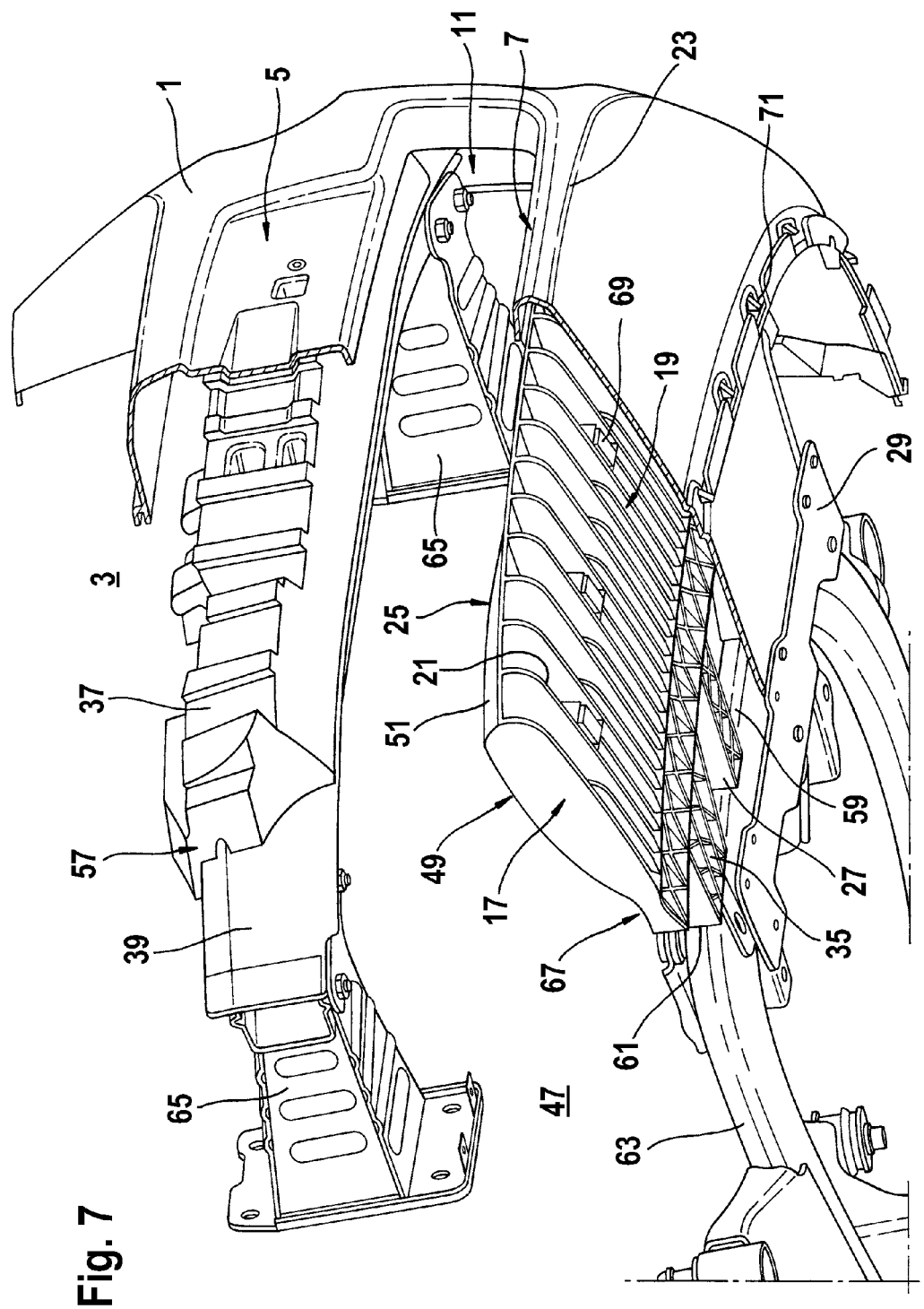

REINFORCING ELEMENT FOR A LOWER AREA OF A FRONT BUMPER, AND CORRESPONDINGLY EQUIPPED BUMPER FOR A MOTOR VEHICLE

CROSS-REFERENCE TO RELATED APPLICATIONS

This application is a U.S. National-Stage entry under 35 U.S.C. §371 based on International Application No. PCT/EP2005/007860, filed Jul. 19, 2005, which was published under PCT Article 21 (2) and which claims priority to German Application No. DE 10 2004 035 435.9, filed Jul. 21, 2004.

BACKGROUND

The present invention relates to a reinforcing element for a lower region of a front bumper of a motor vehicle for the protection of pedestrians during impact of a lower leg section against the lower region of the front bumper, according to the preamble of claim 1, and a front bumper for a motor vehicle having a first impact region, which is to come into contact with a bumper of a further motor vehicle, and a second impact region arranged below the first impact region, and which is to come into contact with a pedestrian with his lower leg section.

In recent decades the automobile industry has been facing to an increasing extent the protection of pedestrians in accidents. Reducing injury risks during an impact between a motor vehicle and a pedestrian has gained considerable significance over the years.

Hence, it was already discussed, for example decades ago in German Disclosure Number 3 003 568, that in an impact protection device known at that time, the pedestrian protection part should be designed as an upholstered transverse beam, which is arranged lower than the actual bumper and also in front thereof. A pedestrian colliding with the vehicle should thus be caught so deep by this lower transverse beam, that he is not knocked down and then run over, but is tilted onto the relatively soft, deformable vehicle front, as a result of which the danger of injury or at least the severity of the injuries is considerably reduced. These first pedestrian protection parts were in turn not successful, inter alia, because of concerns of the designers and because of manufacturing difficulties and of course the feared impaired aerodynamic properties and a feared impaired force effects of the vehicle front.

At the end of the nineties, international regulation regarding vehicle-side pedestrian protection was discussed together with the European automobile industry. Tests were to be developed, with which a motor vehicle front part may be assessed qualitatively according to the following criteria: a) impact with a lower leg, b) impact with a thigh, c) impact with the hip, and d) impact with the head on a front bonnet of a motor vehicle.

These efforts by the European automobile industry and the legislator resulted finally in the guideline 2003/102/EG for the protection of pedestrians and other non-protected road-users from and in collisions with motor vehicles.

Some of the criteria for assessing the quality of motor vehicle front parts are meant for the requirements for an impact with a lower leg. Hence, at a collision speed of 40 km/hour, the following criteria for the standard ACEA Phase 1 should be fulfilled: a) a dynamic knee-bending angle between thigh and lower leg should be less than 21°, b) shearing in the knee or knee-shearing displacement should be less than 6 mm, and c) acceleration of the lower leg should be less than 200 g (measured at the upper end of the shin-bone). Furthermore, at an impact speed of 40 km/hour, the following criteria for the standard ACEA Phase 2 should be fulfilled: a) a maximum dynamic knee-bending angle between thigh and lower leg of 15°, b) maximum shearing in the knee or knee-shearing displacement of 6 mm, and c) a maximum acceleration of the lower leg of 150 g (measured at the upper end of the shin-bone).

Parallel to the work on guideline 2003/102/EG, embodiments of bumper arrangements which were different from the automobile industry were proposed for a front region of a car encased with a shell. Various examples of this can be found, inter alia, in European granted patent 1 038 732, in European application 1 103 428, in German Disclosure No. 10 304 784, and in European application 1 300 293.

Furthermore, front bumpers for motor vehicles having a first impact region, which is to come into contact with a bumper of a further motor vehicle, have become known from practice, which should also have a second impact region arranged below the first impact region and which is to come into contact with a pedestrian with his lower leg section. The bumper is thus encased with an outer shell, which, inter alia, should ensure an attractive aesthetic external appearance and should guarantee the required aerodynamics. Furthermore, the bumper is supported against a transverse support, which is mounted on the longitudinal supports of the car body by means of crash boxes or the like. The second, lower impact region should thus have a reinforcing element, which is often also designated as a so-called "Lower Bumper Stiffener" (abbreviation: LBS) for "Pedestrian-Protection Lower Leg Impact" or may be designated as a reinforcement of the lower front bumper region for the protection of pedestrians in a leg impact.

An embodiment of such a "Lower Bumper Stiffener" for "Pedestrian-Protection Lower Leg Impact" is discussed, for example in European granted patent 1 038 732 already cited above. The second impact region should thus lie vertically below the first impact region or essentially in the vertical of the latter, that is, the upper and the lower impact region should be arranged exactly above one another, so that the latter form a common vertical front surface towards the front. The lower impact region should thus be formed by the lower part of the bumper, which is mounted as the second lower transverse support below the first transverse support thereon by means of vertically arranged spacers. However, the current strict guidelines for reliable pedestrian protection cannot thus be adequately fulfilled.

Furthermore, in European granted patent 1 038 732, the reinforcing element described there is an integral component of the lower front bumper region, with which it is integrally formed. This integral reinforcing element has a base plate facing towards the ground with the lower side and which terminates the front bumper horizontally. Reinforcing ribs extending in longitudinal direction and arranged parallel next to one another are mounted on this base plate, and extend to the rear starting from a front wall of the lower front bumper and which should ensure stiffening of the base plate with the forward front wall of the lower front bumper. A crossed rib structure is also provided to reinforce the front-side edge region. Finally, the upper and the lower bumper of the front bumper arrangement of European granted patent 1 038 732 are covered externally or towards the front by a common casing designated as a "shield".

However, such known reinforcing elements have the considerable disadvantage that they are often exposed to considerable mechanical impact stresses from below, which then lead to cracks in the shell structure or in the lower bumper region, due to the necessary low height of the lower impact region above the ground, which has to be selected relatively tightly in order to ensure that a lower leg section, such as for example the ankle, the shin-bone or the calf of a lower leg are struck correctly, for example when driving over today's increasingly high curbs when parking, or for example when driving into a multi-storey car park due to the abrupt change in gradient of the road there of the approach and exit ramps. However, repairs to such reinforcing elements molded in one piece integrally in the front bumper makes the exchange of the entire front bumper necessary, which is associated with considerable costs. The repair costs thus additionally rise, since today's front bumpers are often painted in the color of the car. This brings with it corresponding painting work, which in turn, including corresponding dismantling and assembly work, may easily lead to use stoppage lasting several days, which in the end causes the replacement use of a hired car.

On the whole, particularly from the view of a responsible motorist, who thinks about how he can protect pedestrians and other non-protected road-users by means of passive security installed in the car, an unsatisfactory situation thus exists, which finally produces a rejection stance against motor vehicles and such inadequately designed front bumpers, which in the end in turn makes difficult implementation of corresponding measures for the protection of pedestrians on a broad front.

SUMMARY

Accordingly, it is the object of the present invention to provide a reinforcing element for a lower region of a front bumper of a motor vehicle of the type discussed in the introduction, while avoiding the disadvantages discussed above, which can be produced cost-effectively, assembled easily, and can also be repaired inexpensively if required.

A further important aspect of the present invention is the considerable improvement in protective properties of a front bumper equipped therewith in order to significantly fall below the limiting values required today.

A reinforcing element for a lower region of a front bumper of a motor vehicle for the protection of pedestrians during the impact of a lower leg section, such as for example the ankle, the shin-bone, the calf bone or a further section of the lower leg, against the lower region of the front bumper is thus proposed, wherein the reinforcing element is connected behind, in direction of travel, the lower region of the front bumper to the latter, has a base plate with reinforcing ribs attached thereto, and extends essentially in horizontal direction approximately over the width of the front bumper.

It is thus proposed for the first time that the reinforcing element is designed as a separate plate which can be integrated in the lower bumper region.

Hence, optimization of the separate reinforcing element designed like a plate may be carried out in advantageous manner with reference to its mechanical properties without at the same time problems having to be feared in optimization of the aesthetic appearance of the exterior of the front bumper which is attractive to the observer. Furthermore, optimization of the strength of the reinforcing element may take place without at the same time having to accept impairment of the aerodynamic properties of the front bumper.

Consequently, for the first time the aerodynamic properties, the aesthetic appearance, the constructive design, the strength and the other mechanical properties of a front bumper or its lower impact region, may be optimized separately and independently of one another, in order to thus obtain in total a considerably improved appearance, to achieve improved aerodynamics, and at the same time to achieve considerably improved protection of pedestrians against the danger of injury, that is in the end to fall below as far as possible the required limiting values.

Furthermore, the separate plate-like reinforcing element of the invention offers the advantage that when the reinforcing element is damaged, for example due to inadvertent driving over a particularly high curb or when contacting a ramp of a multi-storey car park, the reinforcing element may be exchanged separately. The immense repair costs may thus be reduced. At the same time this leads to a considerable increase in acceptance of a motor vehicle thus designed by the purchaser.

Furthermore, the front bumper of the invention and the reinforcing element of the invention provided therefor, offers the advantage that this can be produced more cost-effectively and can be assembled considerably more easily in serial mass production.

Finally, the reinforcing element as a separate component may be matched considerably more simply in advantageous manner to the particular bumper system, which is specific to the motor vehicle type. It can thus be transferred also for the first time without greater additional effort to a similar special model of a standard bumper system. In addition, the development and modification costs for the die for producing the reinforcing element are considerably more favorable, since the dies required for this are smaller to construct. Hence, the total costs for the front bumper can be further reduced in advantageous manner.

Hence, in one exemplary embodiment of the reinforcing element, provision is made in that the latter can be mounted on the lower bumper region, preferably by means of adhering, clipping, welding, riveting, screwing or the like. The advantageous effect of a reinforcing element designed in a manner which is friendly to after-sales service, which can be easily exchanged, which is designed as a separate plate and which can be assembled, dismantled and may be exchanged without problems, is intensified in this manner.

In a further preferred embodiment, provision is made in that the reinforcing ribs, in the mounted state of the reinforcing element, extend downwards from the upper-lying base plate oriented towards the engine compartment with its rear side. This offers the advantage that a front bumper equipped with this reinforcing element offers a cleanly closed surface towards the engine compartment, which offers no points of attack for oil, coolant from the radiator or the like, possibly running out due to ageing processes and in addition in normal every day use ensures that dirt, spray, mud or rain water penetrating through the engine compartment or whirled-up by the road may flow away without problems over the flat surface of the reinforcing element rear, does not adhere in any chambers there or is not deposited there and in the end, for example in winter, does not lead to frost damage or the like.

The base plate of the reinforcing element should indeed preferably have ribs projecting downwards, however they may also project upwards in some cases. The base plate does not need to be absolutely flat, but may be adapted with its geometry to the existing package conditions of the motor vehicle, for example as a slightly curved plate. The ribs may be attached, riveted, screwed, sprayed, molded, adhered on the base plate or may be connected to the latter as an assembly part. The reinforcing or stiffening ribs may be matched to one another in optimum manner with respect to their distance from one another, with respect to their material thickness, construction height, length, position, alignment and connections with one another (for example as diagonal ribs, transverse ribs, crossed ribs or the like) for optimal achievement of the "lower leg" pedestrian protection guidelines taking into account the vehicle-specific conditions. The reinforcing ribs do not necessarily need to run in a straight line.

According to a further preferred embodiment, provision is made in that the reinforcing element is surrounded like a shell at least partly by a front, in direction of travel, section of the lower bumper region. This offers the advantage of optimum aerodynamic surrounding or covering of the reinforcing element designed like a plate. Hence, aerodynamic matters and uplift effects may be taken into account in this manner without at the same time impairing the mechanical stiffness and loadability of the reinforcing element. At the same time the connection comprising shell-like surrounding of the bumper region with the strengthening element produces a particularly stiffened and stable construction, so that the required limiting values for pedestrian protection may be maintained particularly well.

According to a further preferred embodiment, provision is made in that the reinforcing ribs extend essentially at right-angles from the base plate and are molded integrally thereon from the same material. Hence, the reinforcing element may be produced extremely cost-effectively in advantageous manner as an installation component made from the same material, for example as a plastic injection-molding or the like.

As a result of a further preferred embodiment, provision is made in that attachment points, preferably latching projections or similar latching means or clipping means, are formed in the base plate and/or between the reinforcing ribs. This offers a particularly cost-effective attachment possibility for the reinforcing element in the lower region of the front bumper. Provision is thus also made in that the attachment points in the base plate or between the ribs correlate with corresponding attachment points in the shell of the lower bumper region, which are preferably designed as latching openings. Hence, the handles required for assembly of the front bumper of the invention can be considerably reduced. Hence, it is advantageously ensured that the reinforcing element of the invention, which exists as a separate plate which can be integrated in the lower bumper region, may be integrated by latching without problems using a grip in the lower bumper region. Simplification of the vertical range of manufacture and of the assembly sequences in mass production is a further positive effect.

Furthermore, provision is made in that the base plate has cruciformly designed reinforcing ribs in the rear, in vehicle longitudinal direction, region, to which longitudinal ribs orientated essentially in longitudinal direction and arranged parallel to one another towards the front, are connected. This offers the advantage that the plate-like reinforcing element is designed in the figurative sense, as a kind of hand from the wrist of which the rib-like fingers extend towards the front, the finger tips of which absorb the collision forces from the lower bumper region, thus ease the collision and divert the impact energy in controlled manner via the wrist. Hence, optimum flow of force and particularly good protection of the person concerned during impact is produced.

Furthermore, provision is made in that the base plate on its rearward side facing the engine compartment supports a radiator deflection device. Hence, during a collision it is ensured in advantageous manner that the radiator is sheared off or torn off at corresponding predetermined break points and can move freely to the rear, instead of dropping away downwards or being pressed against the engine block. The radiator thus remains in working order and the journey may be continued using the vehicle from its own power at least as far as the next workshop. Hence, a breakdown service may be dispensed with in appropriate circumstances. In addition, the guidelines of the so-called "Danner test" may thus be maintained. Finally, an improved damage picture is produced and accordingly more favorable classification of the vehicle at the insurance companies.

Finally, provision is made in that the reinforcing element is produced from plastic, preferably from thermoplastic plastic. This offers on the one hand in advantageous manner, cost-effective production and on the other hand the further advantage of manufacture, for example within the framework of a plastic injection-molding process, which in turn likewise can realize cost-saving effects. In addition, such plastic parts may be constructed in complex manner, achieve high strengths, at the same time can be easily built and hence mean no unnecessary weight for the vehicle.

The base plate of the reinforcing element and its ribs may be provided partly with holes or cut-outs for further weight reduction. The reinforcing element will indeed preferably be produced from plastic, inter alia, for reasons relating to particularly good moldability, thermoplastic plastics are particularly preferably used. Instead however, GRP, CRP or other composite materials or stable but at the same time light materials, may also be used. Optionally material reinforcements, for example fillers, for example also made from metal, inlets, inserts or the like, may be provided for further stiffening of the reinforcing element.

The object discussed above is also achieved in that a front bumper for a motor vehicle having a first impact region, which is to come into contact with a bumper of a further motor vehicle, is proposed. Furthermore, this front bumper has a second impact region arranged below the first impact region, and which is to come into contact with a pedestrian with his lower leg section. The bumper is thus encased by an outer shell and is supported in the first impact region against a transverse support, which is mounted by means of crash boxes or the like on the longitudinal supports of the car body.

It is thus proposed for the first time that the front bumper has a reinforcing element behind, in vehicle longitudinal direction, the second, lower impact region, as discussed above. Hence, the advantages discussed above can also be achieved in synergistic manner using a thus designed front bumper. In this respect reference is made to the above discussion.

BRIEF DESCRIPTION OF THE DRAWINGS

The present invention will hereinafter be described in conjunction with the following drawing figures, wherein like numerals denote like elements.

FIG. 4 shows in two part views a) and b) in each case an enlarged, schematically simplified section of the bumper shown in FIGS. 1 to 3, wherein in part view a), latching between the reinforcing element and the bumper shell is explained and in part view b) the attachment to the transverse strut in section is explained;

FIG. 7 shows in a three-dimensional view at an angle from the front at the bottom, the embodiment of a front bumper shown in FIGS. 1 to 6 with separate reinforcing element integrated in the lower impact region of the bumper facing, including its rear support against an auxiliary frame arranged below the engine compartment.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
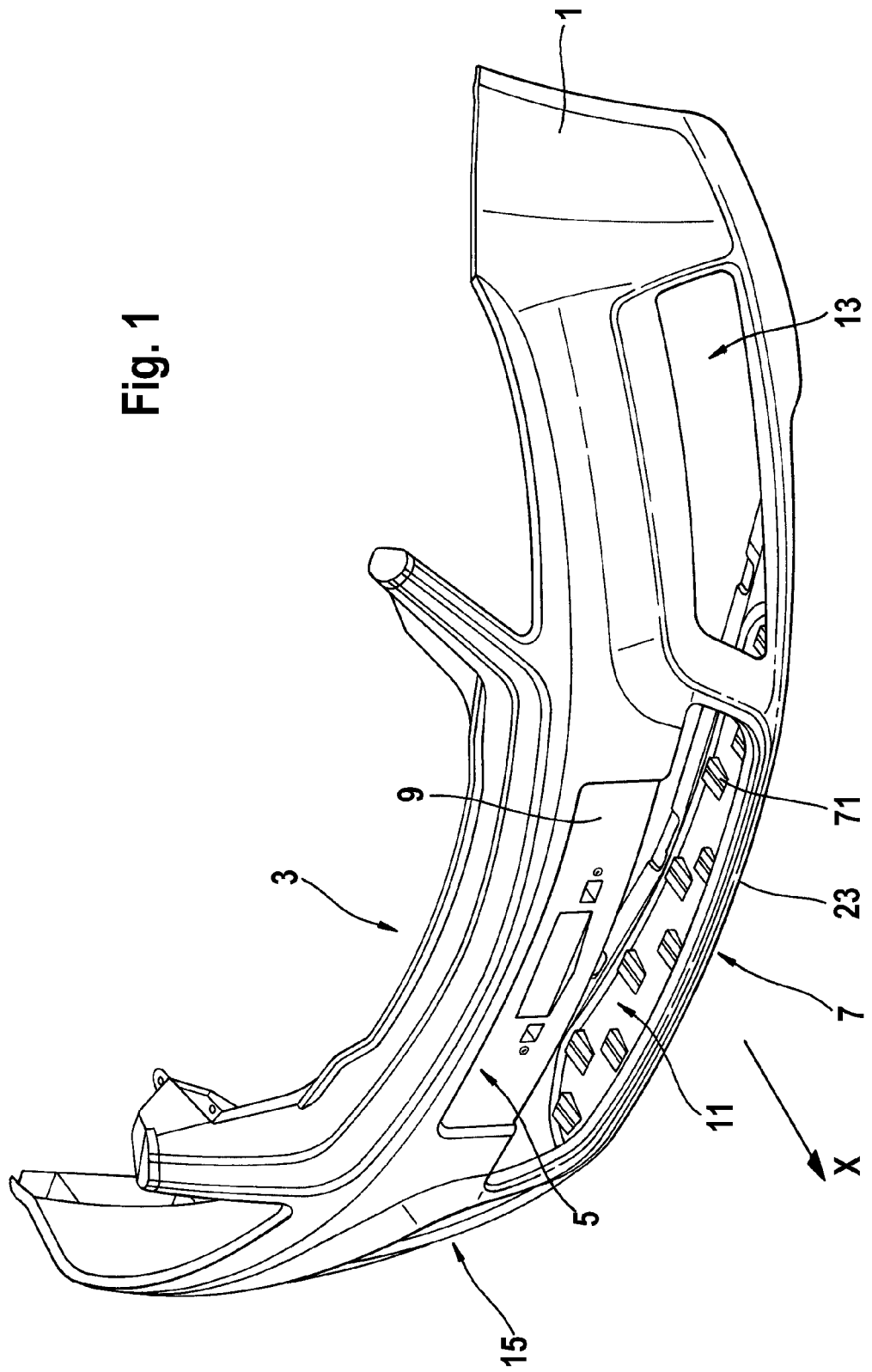
FIG. 1 shows in a three-dimensional view at an angle from the front, an exemplary embodiment of an outer shell or facing of a bumper formed as a molding with an upper and a lower impact region.

FIG. 1 shows in a three-dimensional view at an angle from the front, an exemplary embodiment of an external shell or facing 1 of a bumper 3 formed, for example as a molding, with an upper impact region 5 and a lower impact region 7. The facing or shell 1 of the bumper 3 is produced integrally, for example from thermoplastic plastic, and may be painted in the color of the vehicle. A recess 9 for receiving a registration plate not shown in more detail is situated in the upper impact region 5. An opening 11 can be seen therebelow, which serves as an air inlet for the radiator arranged behind the bumper 3 and not shown in more detail. The facing or shell 1 extends essentially over the entire width of the motor vehicle and spreads, for example by means of its front corners towards the side. Further openings 13 and 15, which may serve, for example for receiving low-lying lighting means, such as for example fog lights, indicators or the like, are provided on the left and on the right of the air opening 11. The openings 13 and 15 may also be provided with grills and serve as further air passage slots.

The lower impact region 7 in the mounted state of the bumper 3 is arranged at a height above the ground or above the road which corresponds approximately to the centre of the lower leg of a normal adult human being. The lower impact region 7 may project towards the front slightly beyond the upper impact region 5. Furthermore, the lower edge of the lower air passage opening 11 may project in longitudinal or travel direction X approximately the same amount as the upper edge of the air opening 11. It is ensured that when accidentally running into a pedestrian, he is first hit so low in the region of the lower leg that he cannot be knocked down and then run over, but is tipped onto the relatively soft, deformable motor vehicle front or the engine bonnet, as a result of which the danger of injury or at least the severity of the injury is considerably reduced. At the same time undesirable bending of the lower leg with respect to the thigh in the knee region is thus prevented.

In order to guarantee the afore-mentioned tilting of an accidentally hit pedestrian over the motor vehicle front onto the engine bonnet, the lower impact region 7 must however have a certain stiffness, which cannot thus be achieved solely by the facing or shell 1 of the bumper 3. The necessary stiffness is achieved by the reinforcing element 17. The reinforcing element 17 is latched into the latching hook 71.

Figure 2:
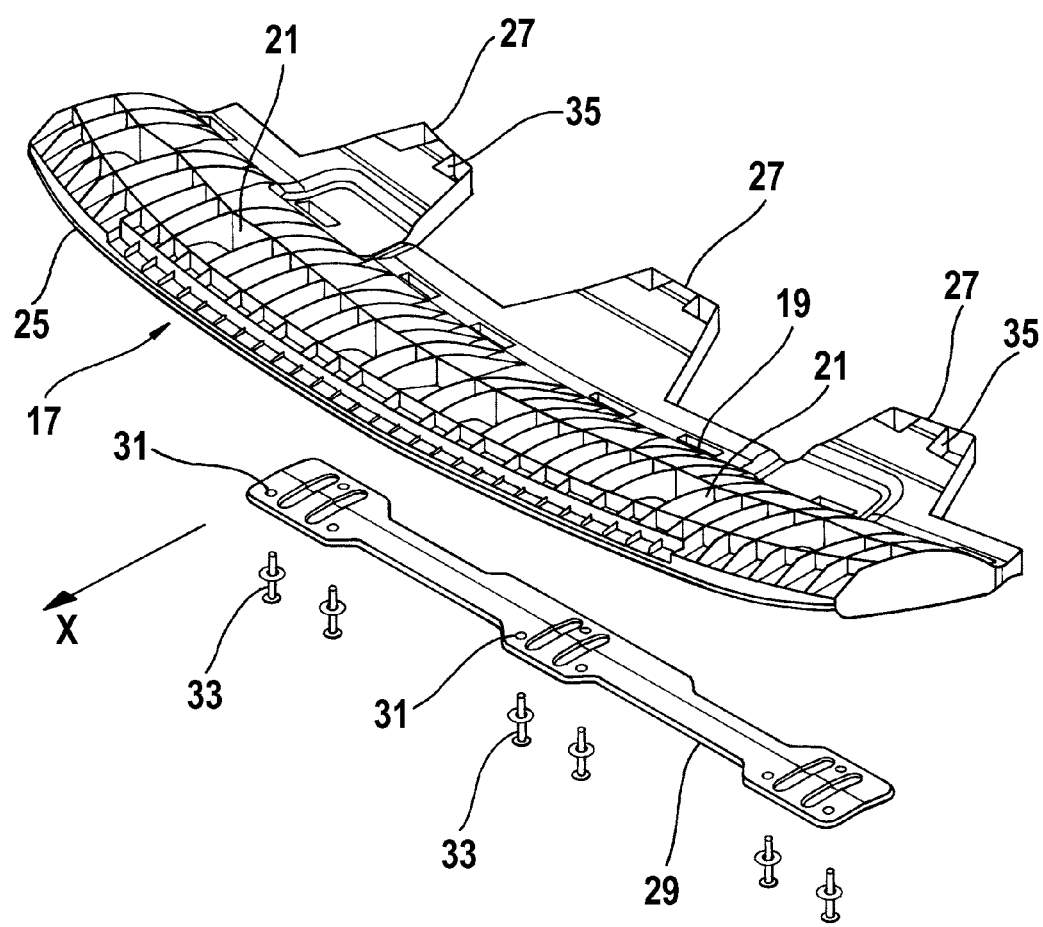
FIG. 2 shows in a three-dimensional view at an angle from the front, an exemplary embodiment of a reinforcing element, which is formed as a separate plate which can be integrated in the lower bumper region, wherein the embodiment shown has a base plate which has a grill structure or reinforcing ribs on both sides (bottom and top)

FIG. 2 shows in a three-dimensional view at an angle from the front, an exemplary embodiment of such a reinforcing element 17, which is formed as a separate plate 19 which can be integrated in the lower bumper region 7.

The reinforcing plate 19 in the embodiment shown here to illustrate the reinforcing or stiffening ribs 21, has a base plate, which supports ribs on both sides of the base plate, that is top and bottom. The base plate may be arranged nevertheless, depending on the embodiment and application or required strength, etc., above and/or below the reinforcing ribs 21. An embodiment is also conceivable, in which base plates are arranged on both sides of the reinforcing ribs 21; as shown here schematically and in simplified manner. In a preferred embodiment, the stiffening ribs 21 and the base plate arranged above the ribs are produced integrally from a thermoplastic plastic.

The reinforcing ribs 21 may extend in longitudinal direction X of the motor vehicle and be arranged parallel next to one another. Reinforcing ribs may also extend partly transversely thereto. Ribs crossing one another for further stiffening of the plate 19 are also provided in the rear region of the reinforcing plate 19.

The reinforcing element 17 extends essentially in horizontal direction approximately over the width of the front bumper 3. The reinforcing element 17 is formed as a separate plate 19 which can be integrated in the lower bumper region 7. The plate 19 does not have to be designed to be absolutely flat, but may be adapted with its contour to the preset conditions and the particular packaging situation of the motor vehicle.

The reinforcing element 17 can be mounted on the lower bumper region 7 by means of adhering, clipping, welding, riveting, screwing or the like. The reinforcing ribs 21 extend downwards in the mounted state of the reinforcing element 17, for example from the upper-lying base plate pointing towards the engine compartment not shown in more detail with the rear side. The reinforcing element 17 is encased like a shell at least partly by the front, in direction of travel, section 23 of the lower bumper region 7.

The reinforcing element 17 is thus integrated in the front section 23 with its front section 25 and supported against an attachment element 29 via arms 27 arranged on its rear end, which attachment element 29 in turn may be supported, for example against a corresponding support or a corresponding transverse strut. The attachment strip or the attachment strut 29 is formed as an elongated assembly plate which has bores 31, through which corresponding attachment means 33, such as for example screws, bolts, rivets, plug-in pins or the like, are pushed and hence a firm connection with the reinforcing element 17 may be produced. The arms 27 thus have corresponding passage openings or recesses. The arms 27 are molded integrally in the rear region of the reinforcing plate 19 in the embodiment shown here to the latter and have reinforcing ribs 35.

Figure 3:
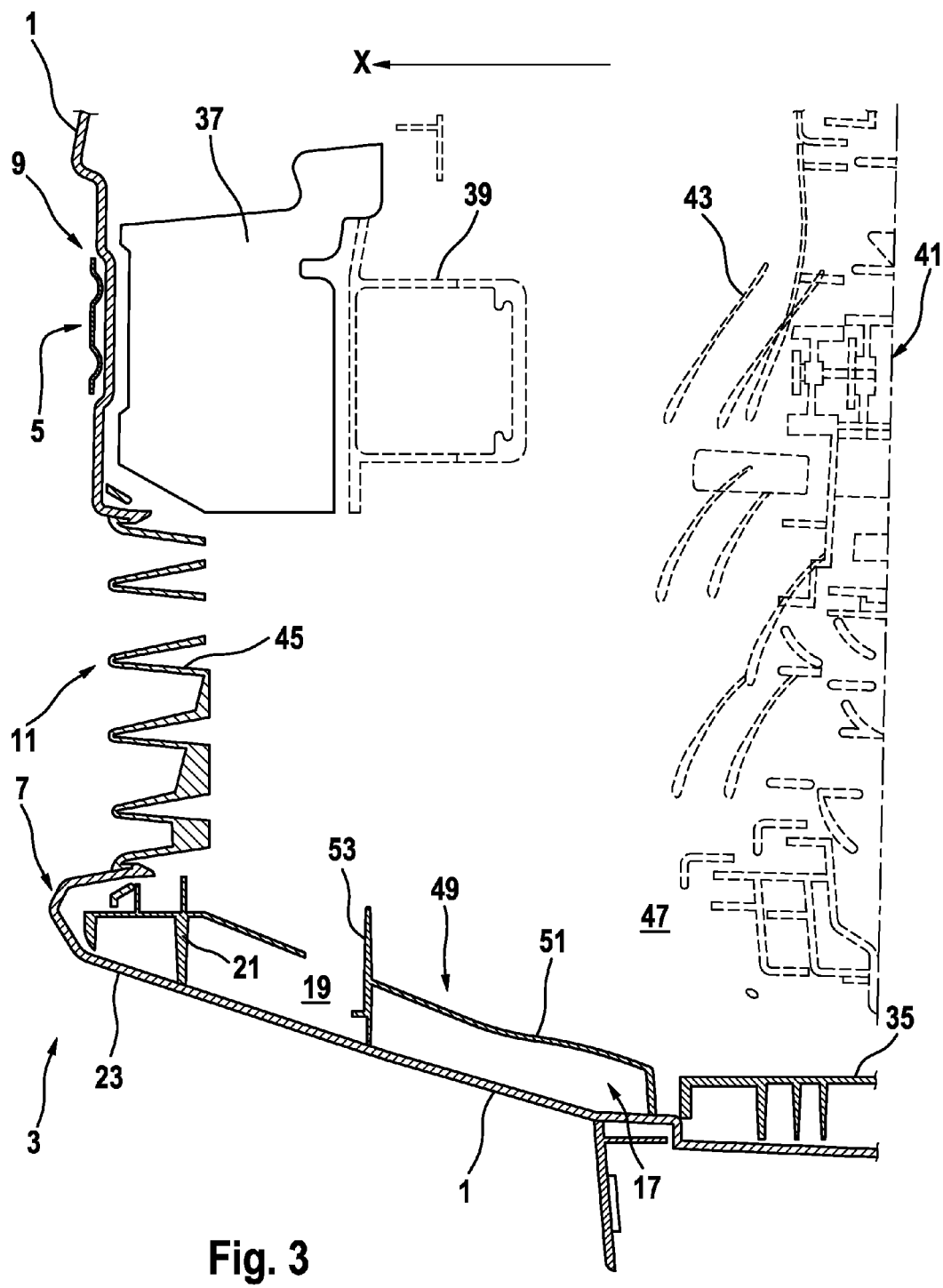
FIG. 3 shows a vertical section in a first plane extending in longitudinal direction parallel close to the vehicle centre through the bumper shell shown in FIG. 1 with reinforcing element shown in FIG. 2 integrated therein in the lower bumper region, and an air inlet grill inserted between the upper and lower impact region below a number plate region also present in the upper impact region, and an absorber element formed as a molding and arranged between the upper impact region of the bumper shell and a transverse support (shown as a dashed line) arranged therebehind.

The bumper 3 shown in FIG. 1 and the reinforcing element 17 shown in FIG. 2 are shown in FIG. 3 in a vertical section through a plane lying in longitudinal direction X and arranged parallel to the vehicle centre. Here, the bumper shell 1 and the reinforcing element 7 integrated therein are shown in section by continuous lines. Furthermore, the transverse support 39 and a radiator 41 with its fan wheel 43 are shown by a dashed line in FIG. 3. An absorber element 37 is arranged between the upper impact region 5 of the casing 1 of the bumper 3 and the transverse support 39 to absorb crash energy. The transverse support 39 is supported in turn against longitudinal supports via crash boxes not shown here in more detail.

The air opening 11, through which air may flow to the radiator 41, is encased by a grill 45, which is clipped into the shell 1.

The reinforcing element 17 has on the rear side 49 facing the engine compartment 47, a base plate 51, from which the reinforcing ribs 21 extend downwards essentially at right-angles and in the embodiment shown are molded integrally onto the base plate 51 from the same material.

The reinforcing plate 19 has on the rear side 49 of the base plate 51 a radiator deflection device 53 facing the engine compartment 47, which ensures that in the event of a collision, the radiator 41 may be released from its anchoring when the bumper 3 is pressed in.

FIG. 4 illustrates in two schematically simplified, enlarged sectional views in a part section a) a forward attachment of the reinforcing element 17 to the shell 1 of the bumper 3 and in part section b) a rear attachment of the reinforcing element 17 to a transverse strut 59.

The reinforcing element 17 is latched or clipped in the lower region 7 of the front bumper 3 in its front section 23 by the latching element 69 formed, for example as a latching projection, in a latching opening 71 correlating therewith. The rear end of the reinforcing element 17 rests with a shoulder 61 of the arm 27 in front of the transverse strut 59. The arm 27 is thus attached to the transverse strut 59 by the connecting element or the attachment strut 29, wherein the rear end of the bumper shell 1 as an external sleeve is held at the same time by the connecting element 29 or is attached to the latter. The reinforcing element 17, the attachment strut 29 and the shell 1 are thus connected to one another using an attachment means not shown in more detail (see for example FIG. 2 or 6, there reference number 33), which is guided through a common opening.

Figure 5:
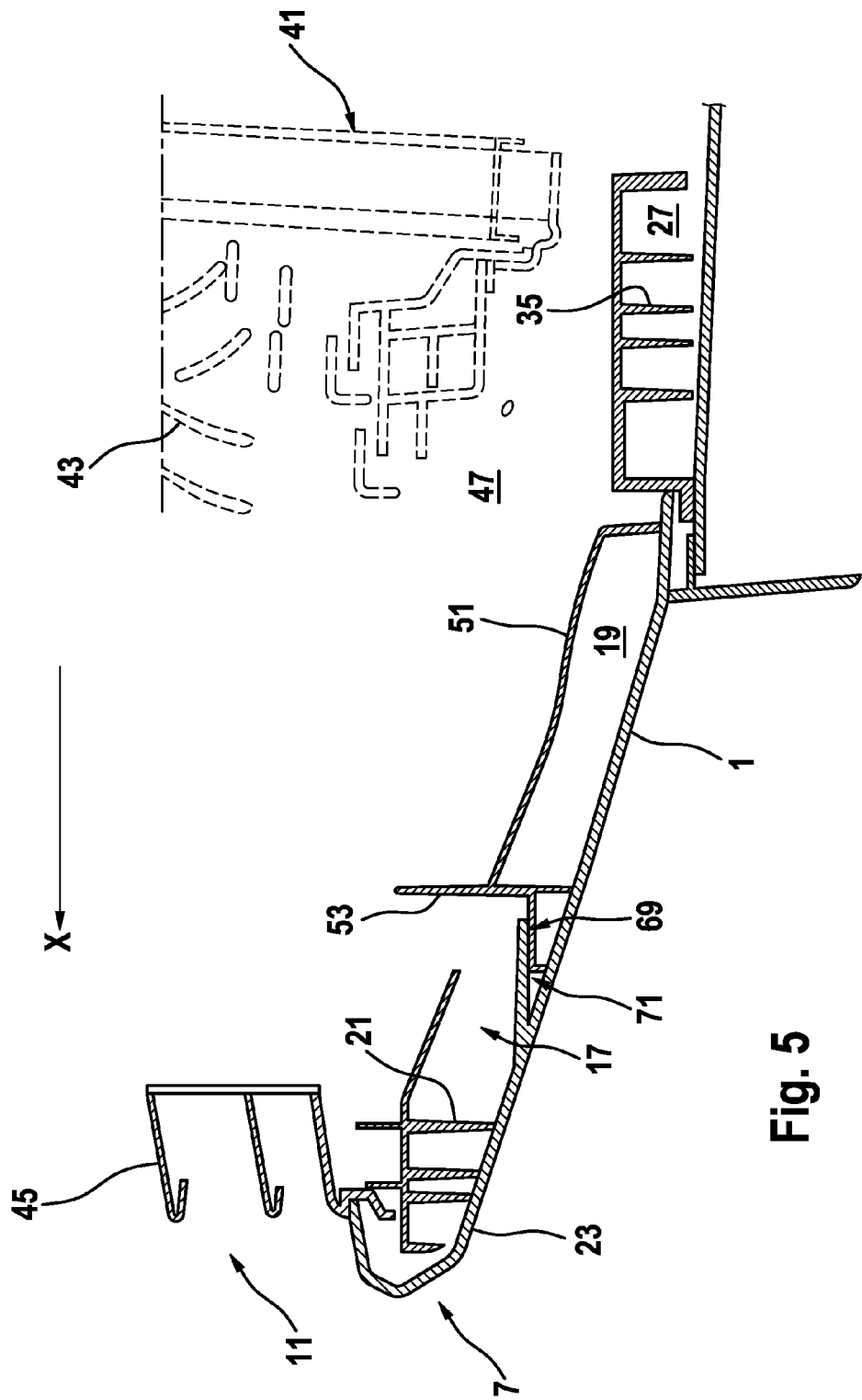
FIG. 5 shows a vertical section in a further second plane extending in longitudinal direction in the vehicle centre through the bumper shell shown in FIG. 1 with reinforcing element with radiator indicated by a dashed line shown in FIG. 2 and integrated therein in the lower bumper region, wherein latching of the reinforcing element is shown in section.

FIG. 5 shows in a vertical section in a further second plane extending in longitudinal direction X in the vehicle centre through the bumper shell 1 shown in FIG. 1 with reinforcing element 17 integrated therein in the lower bumper region 7 shown in FIG. 2 with radiator 41 indicated by a dashed line. As becomes clear from FIGS. 2 to 5, the reinforcing element 17 has various reinforcing ribs 27. The base plate 51 of the reinforcing element 17 supports reinforcing ribs 35 formed, for example cruciformly, in the rear, in vehicle longitudinal direction, region. Towards the front, the reinforcing ribs are arranged, for example essentially parallel to one another, and extend essentially in longitudinal direction X. In addition, transverse ribs, which cannot be seen in section, are provided in some cases for further stiffening. In some cases the lines also indicate the tapering tips of the longitudinal ribs 21. Furthermore, for example a latching projection 69 present in the reinforcing element 17 between the ribs 21 pointing downwards, is shown in section.

Figure 6:
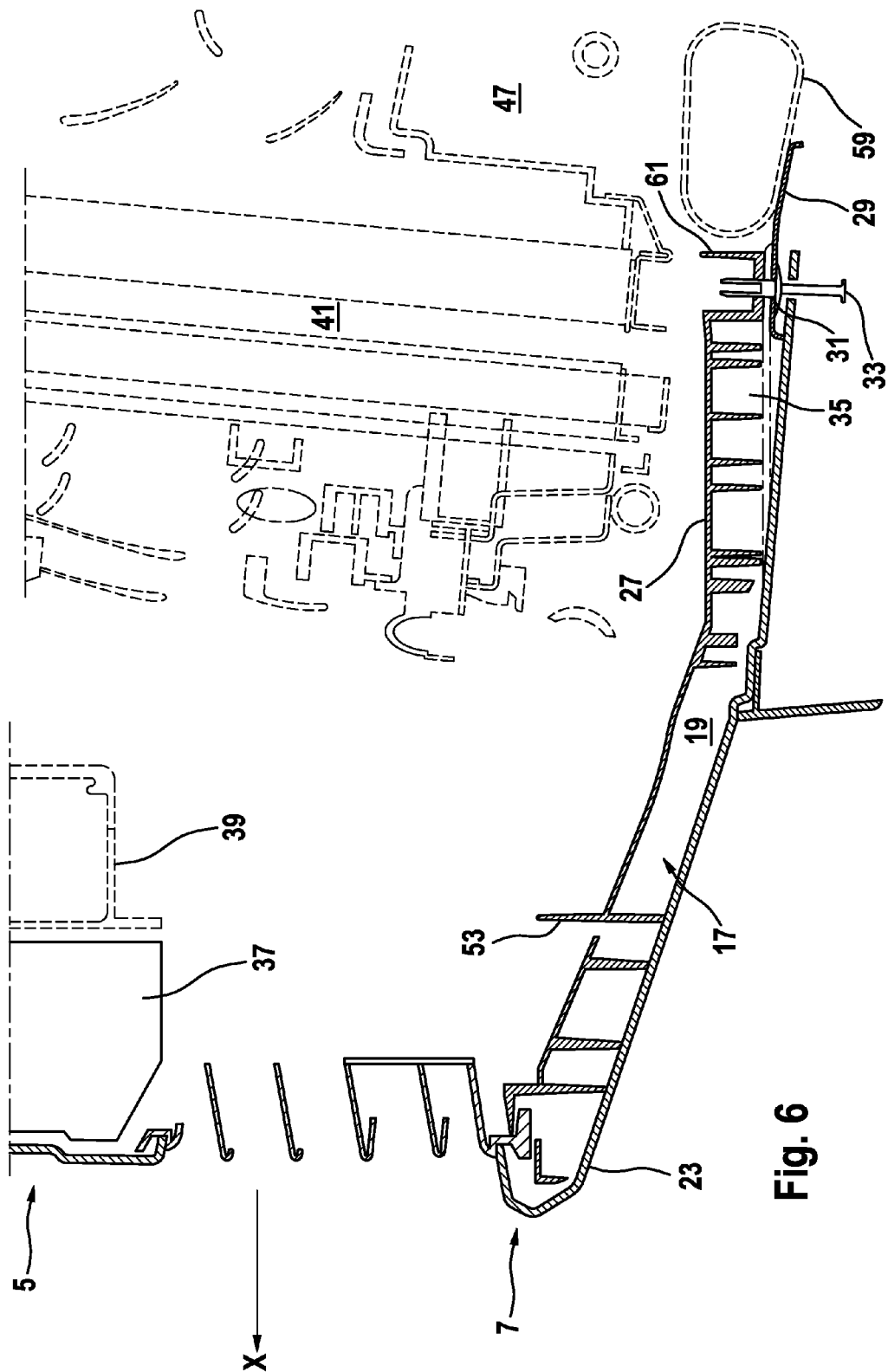
FIG. 6 shows a vertical section in a further third plane extending in longitudinal direction just in front of the vehicle centre through the bumper shell shown in FIG. 1 with reinforcing element shown in FIG. 2 and integrated therein in the lower bumper region, with rear support of the reinforcing element indicated as a dashed line against a strut shown as a dashed line in section arranged below the radiator.

FIG. 6 shows a further section in a fourth plane just in front of the vehicle centre, with rear support of the reinforcing element 27 indicated by a dashed line against a strut 59 arranged below the radiator 41 and shown in section by a dashed line. The reinforcing element 17 formed like a plate is supported in its rear region on the transverse strut 59 by the elongated attachment element or the attachment strut 29, wherein the attachment strut 29 is attached to at least one arm 27 by means of clips, rivets, bolts or similar attachment means 33, which project through a bore 31, in the rear region of the reinforcing element 17. The arm 27 of the reinforcing plate 19 may thus be supported either, as shown here, by means of the attachment strut 29 below the transverse strut 59 on the latter, or also may be attached above the latter. What is thus important is that the reinforcing element 17 may be supported in longitudinal direction X rearwards against the transverse strut 59 or a similar component by its rear edge 61 or by corresponding sections, such that the reinforcing plate 19 does not give way upwards or downwards during loading in longitudinal direction.

As can be seen from FIGS. 1 to 6, the lower impact region 7 projects beyond the upper impact region 5, so that it is ensured that the lower leg region of an accidentally struck pedestrian first comes into contact with the bumper 3.

FIG. 7 illustrates once again in a schematically simplified three-dimensional view at an angle from the front at the bottom, the embodiment of a front bumper 3 shown in FIGS. 1 to 6 with the separate reinforcing element 17 integrated in the lower impact region 7 of the bumper casing 1, including its rear support against an auxiliary frame 63 arranged below the engine compartment 47.

The front bumper system of a motor vehicle shown in FIG. 7 has the transverse support 39 often also designated as front impact limiter or "front bumper beam". So-called holders or "brackets" or crash boxes 65, by means of which the transverse support 39 is supported against longitudinal supports of the motor vehicle not shown in more detail, are mounted on the transverse support 39 on the left and on the right. The so-called impact energy absorber or the absorber element 37 is arranged in travel direction X in front of the impact limiter or transverse support 39, and for example may be formed from an E-PP foamed part. The facing 1 for the front bumper 3 is situated in turn in front of the absorber element 37, wherein the bumper facing 1 is often also designated as "bumper fascia". The lower part 7 of the bumper facing 1 situated below the lower cooling-air opening 11 forms in itself alone initially a non-reinforced bumper section and is attached in the embodiment shown here to the rear likewise on the auxiliary frame 63 or on its transverse strut 59.

The reinforcing element 17 often also designated as "lower bumper stiffener" (abbreviation: LBS) is arranged in the lower part 7 of the bumper casing 1 and clipped in there. In cooperation with the absorber element 37 in front of the transverse support 39, the reinforcing element 17 ensures that the strict "lower leg" pedestrian protection guidelines may be fulfilled. The reinforcing element 17 may not drop away below the auxiliary frame 63 due to the counter-support or the attachment strut 29 formed like a strip, which is attached to the auxiliary frame 63 or to its transverse strut 59, but is supported during a collision by its rear edge 61 or by its rear end 67 on the transverse strut 59 of the auxiliary frame 63. The auxiliary frame 63 is thus often also designated as "sub-frame".

The reinforcing element 17 may have a base plate 51 with, for example ribs 21 projecting upwards/or downwards. In the preferred embodiment shown here, the ribs 21 extend from the base plate 51 downwards. The base plate 51 thus need not be flat, but may be adapted in its particular geometry to the package conditions of the particular motor vehicle. The reinforcing ribs 21 may be sprayed onto the base plate 51, or be connected to the latter as an assembly part. The reinforcing ribs 21 or the rear stiffening ribs 35 of the rear arms 27 of the reinforcing plate 19 may be matched to one another in optimum manner with respect to their distance from one another, with respect to their material thickness, construction height, length, position, alignment and connections with one another (for example diagonal ribs, transverse ribs, crossed ribs or the like) for optimum achievement of the "lower leg" pedestrian protection guidelines taking into account the vehicle-specific conditions. The reinforcing ribs 21 or the stiffening ribs 35 thus do not necessarily have to run in a straight line.

The base plate 51 and the ribs 21 or 35 may be provided partially with holes or cut-outs to reduce weight. The reinforcing element 17 designed like a plate is produced as reinforcing plate 19, for example from plastic, thermoplastic plastic is particularly preferably used. Alternatively, GRP, CRP or other composite materials or stable but at the same time light materials could also be considered. Hence, if required material reinforcements, such as for example fillers, also made from metal, inlets, inserts or the like, may be provided. The reinforcing element 17 can be exchanged as a separate single part in a manner which is friendly to after-sales service. The reinforcing element 17 may be pushed into the front section 23 of the lower bumper casing 7 by its front section 25 and clipped, welded, riveted, and/or bolted to the latter.

The latching lugs 69 present in the reinforcing element 17 between the reinforcing ribs 21 pointing downwards can be seen faintly in FIG. 7. The reinforcing element 17 is latched or clipped into latching openings 71 correlating therewith and which can be seen faintly in the lower region of the front bumper by the latching projections.

The counter-support or attachment strut 29, which extends transversely to the vehicle longitudinal direction X, may be adapted in its shape to the particular geometry of the package conditions of the motor vehicle. If required, stiffening beads and/or an edge surround or flange may be provided in the attachment strut 29. The counter-support or the attachment strut 29 may be matched in material thickness, construction height, position, alignment and connections, to maintaining and optimization of the "lower leg" pedestrian protection guidelines taking into account the vehicle-specific conditions. The counter-support or attachment strut 29 may be provided partially with holes and/or cut-outs to reduce weight. It may be produced from plastic, metal or other light and at the same time adequately stable materials. The counter-support or attachment strut 29 can also be exchanged as a single part in a manner which is friendly to after-sales service. It is thus clipped, welded, riveted and/or screwed only to the auxiliary frame 63 or to its transverse strut 59.

The invention discussed above provides a reinforcing element for a lower impact region of a front bumper of a motor vehicle for the protection of pedestrians during collision of a lower leg section against the lower impact region of the front bumper. The reinforcing element is thus connected behind, in direction of travel, the lower front bumper region to the latter. The reinforcing element has a base plate with reinforcing ribs attached thereto. It extends essentially in horizontal direction, approximately over the width of the front bumper. It is thus proposed for the first time that the reinforcing element is designed as a separate plate which can be integrated in the lower impact region. The above invention also discusses a front bumper equipped therewith for a motor vehicle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A reinforcing element for a lower impact region of a front bumper for a vehicle, comprising:
    a base plate extending essentially in a horizontal direction approximately over a width of the front bumper;
    a plurality of reinforcing ribs attached to the base plate, the plurality of reinforcing ribs extending along said base plate into the lower impact region of the front bumper; and
    a plurality of attachment elements, formed in said base plate between said reinforcing ribs, for attaching the base plate to the front bumper, wherein the plurality of attachment elements are latchable projections configured to latch into corresponding latching opening in the front bumper.

2. The reinforcing element according to claim 1, wherein the latching opening is on a lower bumper region.

3. The reinforcing element according to claim 1, wherein the plurality of reinforcing ribs extend downwards from the base plate facing towards the engine compartment with the rear side.

4. The reinforcing element according to claim 1, wherein the plurality of reinforcing ribs extend essentially at right-angles from the base plate and are molded from the same material integrally thereon.

5. The reinforcing element according to claim 1, wherein the plurality of attachment elements are formed in the base plate between two respective vertical reinforcing ribs traversing the base plate in a first direction and two respective vertical reinforcing ribs traversing the base plate in a second direction.

6. The reinforcing element according to claim 5, wherein the latching opening is in an outer shell of a lower bumper region correlate with corresponding attachment points in an outer shell of the lower bumper region, which are designed as latching opening is in an outer shell of a lower bumper region.

7. The reinforcing element according to claim 1, wherein the base plate has cruciformly designed reinforcing ribs in a rear region in a vehicle longitudinal direction to adjoin the ribs orientated essentially in a longitudinal direction and arranged parallel to one another towards the front.

8. The reinforcing element according to claim 1, further comprising a radiator deflection device protruding upwards from the base plate and is positioned in front of a radiator in the engine compartment.

9. The reinforcing element according to claim 1, wherein the reinforcing element is produced from plastic.

10. A front bumper for a motor vehicle, comprising:
    a first impact region, configured to first come into contact with a bumper of a second motor vehicle during a crash, and
    a second impact region, arranged below the first impact region, configured to first come into contact with a lower leg section of a pedestrian during a crash,
    an outer shell configured to surround the first and second impact regions;
    an absorber element provided behind, in a vehicle longitudinal direction, the first impact region which is mounted by means of a crash box,
    a reinforcing element being provided behind, in a vehicle longitudinal direction, the second impact region, the reinforcing element comprising a plate and reinforcing ribs extending along the plate into a front portion of the reinforcing element which is surrounded by the outer shell at a lower region of the front bumper, and a plurality of attachment elements, formed in said plate between said reinforcing ribs, for attaching the plate to the outer shell, wherein the plurality of attachment elements are latchable projections configured to latch into corresponding latching opening in the front bumper.

* * * * *

UNITED STATES PATENT AND TRADEMARK OFFICE
CERTIFICATE OF CORRECTION

PATENT NO.       : 8,132,851 B2
APPLICATION NO.  : 11/572340
DATED            : March 13, 2012
INVENTOR(S)      : Claus Steller et al.

It is certified that error appears in the above-identified patent and that said Letters Patent is hereby corrected as shown below:

Column 12, lines 39 – 42, "the latching opening is in an outer shell of a lower bumper region correlate with corresponding attachment points in an outer shell of the lower bumper region, which are designed as latching opening is in an outer shell of a lower bumper region" should be changed to --the latching opening is in an outer shell of a lower bumper region.--

Signed and Sealed this
Twenty-first Day of August, 2012

David J. Kappos
*Director of the United States Patent and Trademark Office*